May 20, 1969        J. F. HILLS        3,444,775
NUT FORMED WITH MULTIPLE TORQUE-OFF COLLARS
Filed Feb. 16, 1968
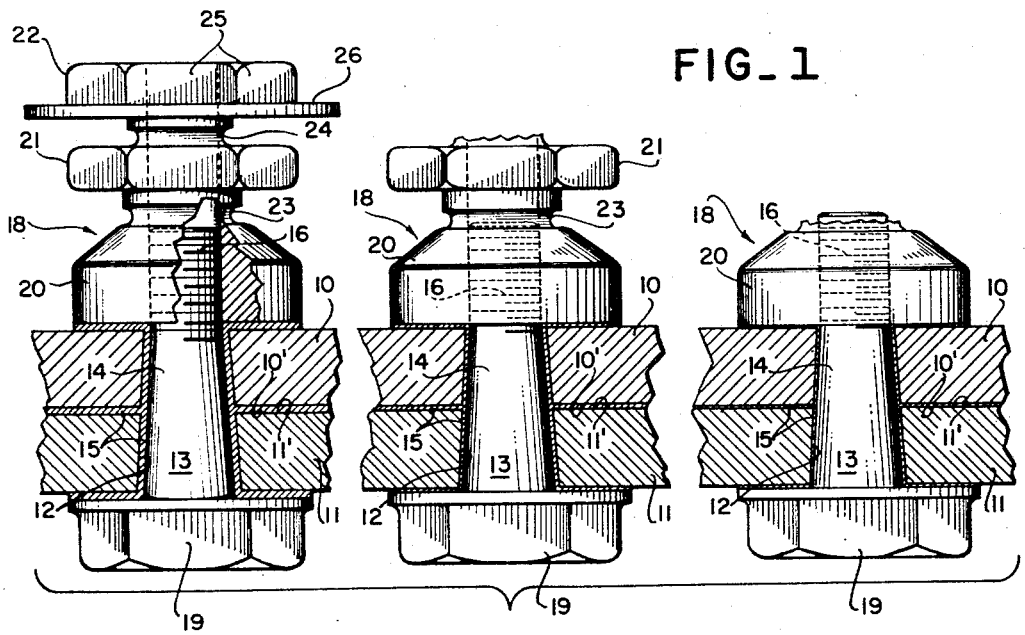
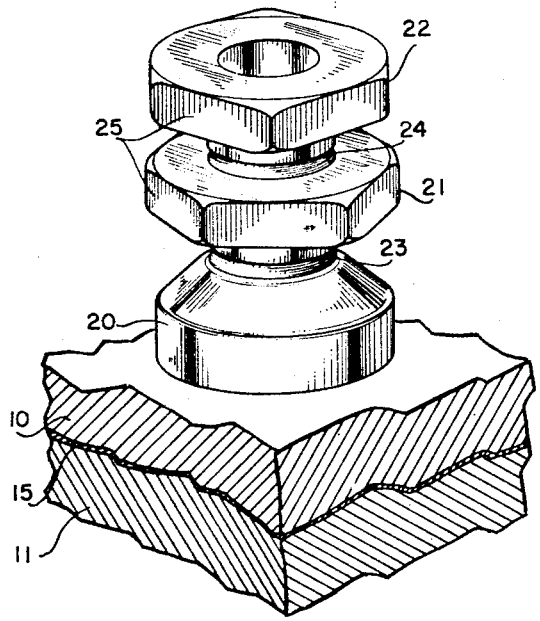
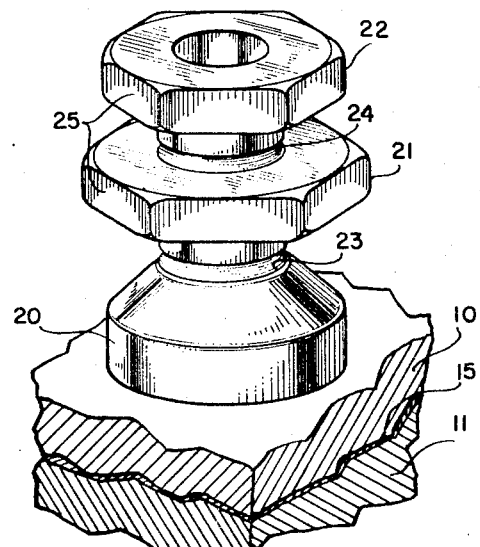
INVENTOR.
JAMES F. HILLS

# United States Patent Office 3,444,775
Patented May 20, 1969

3,444,775
NUT FORMED WITH MULTIPLE TORQUE-OFF COLLARS
James F. Hills, Atlanta, Ga., assignor to Lockheed Aircraft Corporation, Burbank, Calif.
Filed Feb. 16, 1968, Ser. No. 706,033
Int. Cl. F16b 31/00, 33/04
U.S. Cl. 85—61                5 Claims

ABSTRACT OF THE DISCLOSURE

A single nut is provided which can be used to develop multiple torques at different times through discrete and isolated shear sections having different rupture values. This allows for an initial, measured torque to seat a bolt followed by a final, measured torque after the joint has settled or relaxed. Optimum nut size is thereby possible having particular utility in applications involving fatigue critical structure.

---

This invention relates broadly to fasteners and their installation, and more particularly to improvements in fasteners and fastening techniques whereby more effective connections of parts can be obtained through the use of a screw type fastener incorporating a nut having multiple torque-off collars of different shear strengths. A torque-off collar is defined as an external portion on a nut through which torque is applied up to a predetermined value when the collar breaks off leaving an ultimate installation of the nut on its bolt under a precise, calculated torque load. This torque load imposes a pre-stress condition on the joined assembly which improves both static and fatigue performance.

While not limited to, the present invention finds especial utility in the most demanding, present day aircraft applications where maximum strength to weight ratios are required. In these applications internal structure, frames, parts, etc., are designed and fabricated to extremely close strength tolerances. Where holes to accommodate fasteners are required in such marginal strength structures, special precautions must be taken and allowances made to assure against failure of the structure if not before, certainly during normal or expected service operation. Structural reinforcement or "beefing up" of the parts in the areas of such holes is extremely undesirable because of the large number of fasteners used in each aircraft and the aggregate weight involved and also in some cases because of space limitations.

Considerable success has been obtained, among other things, through the use of threaded fasteners with so-called "torque-off collars" by which the forces applied in properly installing these fasteners can be precisely controlled. In essence, the torque-off collar is an internally threaded nut with the outer wrench coacting surfaces, usually in the shape of a hexagon, axially spaced therefrom and connected thereto by a neck having a predetermined shear strength. Thus, as the nut is tightened on its bolt, the neck shears off when the designed torque force is attained and the clamp of the collar against the structure in opposition to the outer bolt head is precisely established so as not to unduly load the fastener or aggravate conditions of the structure in and around the fastener hole.

In addition, it has been found that advantages, notably in an extended service life due to improved corrosion and fatigue resistance, can be obtained through the use of sealants and/or bonding agents in and around the fastener hole as well as between faying surfaces of joined parts. The fastener may be installed while the sealant is either cured or uncured. In either case with the sealant and fastener properly in place, moisture is prevented from entering around the fastener to contact the exposed grain and/or faying surfaces of the structure or joined parts where it can cause corrosion and impair the strength of the connection and/or the basic structural member.

In attempts to gain the benefits of both the foregoing techniques, problems have been encountered. For the most part, these problems stem from the relative movement that occurs between the fastener and the structure or parts subsequent to installation as the joint relaxes or settles. Thus, the associated surfaces of the fastener and structure or parts move or creep, making additional tightening necessary and the precise connection forces difficult to control. These problems are even greater where sealants as mentioned above are employed due to the effect of the sealant flow while curing.

A solution to these problems has usually been effected by means of a special tool or nut to pull the fastener into the hole and into an initial installed position where, following joint relaxation with or without sealant cure, it is tightened by rotating the torque-off collar in the conventional manner into the final torque condition. This is an expensive operation inasmuch as it is time consuming and requires at least an additional tool or nut. It also fails to produce the best connection inasmuch as the initial fastener tightening is not precise (unless measured in a separate operation), and out of an abundance of caution it is invariably less than ideal. Also, final tightening on the cured sealant can be and usually is less than optimum.

The present invention proposes to overcome the above and other shortcomings in producing ideal connections by means of and through a specially designed nut having multiple sequentially tightened torque-off collars. The result is an improved fastener which, following an application of sealant for example, may be initially seated and installed in the hole in a precise and reliable manner by one or more tightening operations up to the maximum force tolerance. Thereafter, preferably upon complete curing of the sealant this fastener can be finally and ultimately secured to the final torque condition under precise, precalculated tightening forces without necessitating the use of special tools or removable nuts to hold the fastener installed while the sealant or bonding agent creeps.

More specifically, it is herein proposed to design a nut with at least two torque-off collars extending coaxially therefrom, each including a wrench coacting surface and a shear neck with each outermost neck designed to a predetermined torque value less than that of the next adjacent inner neck. Included in this nut between each successive shear neck is means to restrict passage of the wrench beyond the outermost wrench coacting surface and into possible engagement with the next inner wrench coacting surface or surfaces.

With the present device, installation is effected by initially tightening the nut on its bolt by rotation of the outermost torque-off collar applying torque forces up to the designed strength of its shear neck. At this point this torque-off collar and the adjacent wrench restricting means break away leaving the balance of the nut including at least one more torque-off collar. Upon settling or further settling of the joint and possibly curing of the sealant or bonding agent, subsequent tightening of each torque collar takes up any relaxation or creep that has occurred. In each tightening step, a precise force up to the ultimate design of that particular collar's shear section may be applied. Ultimately all of the torque-off collars are thereby removed and a minimum size nut remains to complete the installation.

With the above and other objects in view as will be apparent, this invention consists in the construction, combination and arrangement of parts, all as hereinafter more fully described, claimed and illustrated in the accompanying drawings, wherein:

FIGURE 1 is a transverse section taken through a pair of adjacent members having aligned fastener openings with sealant applied to the surfaces thereof and to the faying surfaces of the members and an associated threaded fastener having a tapered shank, for example, to illustrate the application thereto of a nut designed and constructed in accordance with the teachings hereof shown in three stages of its installation: (1) initially threaded onto the end of the bolt shank to draw it into its opening, showing primarily the shear necks of different depths separating the successive collars of the nut as well as means limiting wrench insertion on the outermost collar; (2) tightened to a predetermined torque to place the bolt under predetermined tension in securing the members, showing primarily the assembly after the outermost torque collar has broken off and the members have been clamped together as evidenced by the thickness of the sealant layer between their faying surfaces; and (3) subsequent and finally tightened to place the bolt under the ultimate predetermined tension after the joint has relaxed, showing the ultimate assembly after the last torque-off collar has broken off and the sealant layer reduced to optimum thickness;

FIGURE 2 is an isometric view illustrating a modified nut constructed wherein wrench insertion thereon is limited by angular displacement of the successive torque-off collars in lieu of the stop or partitioning device shown in FIGURE 1; and FIGURE 3 is an isometric view of another nut construction wherein wrench insertion thereon is limited by an enlarged inner collar requiring a different size tool.

Referring more specifically to the drawings, two parts 10 and 11 are adapted to be interconnected one with the other with their surfaces 10' and 11' respectively in substantial abutment. An opening 12 pierces the parts 10 and 11 thus disposed adapted to receive the shank of a bolt 13. Preferably, the opening 12 is tapered and the bolt shank has a corresponding taper as at 14 to provide a predetermined interference fit when installed therein. Prior to the insertion of the bolt 13 in the opening 12, the surfaces of the parts 10 and 11 defining the opening 12 as well as the faying surfaces 10' and 11' are covered with an appropriate sealant 15 to prevent the admission of water or moisture thereto which could result in corrosion. Such sealants are well known to the art and per se form no part of the present invention.

The bolt 13 terminates in a cylindrical threaded end 16 which projects beyond the outer surface of the adjacent part 10 when the bolt 13 is initially inserted in the opening 12. Thus disposed, a nut 18 is adapted to be threaded on the bolt 12 by hand installation or with the use of a tool. In the preferred case, i.e., a tapered fastener is used, the bolt 13 is drawn into the opening 12 to a point where interference is beginning to occur between the surfaces of the tapered shank 14 and parts 10, 11 as shown in the first stage of the assembly on the extreme left of FIGURE 1.

The nut 18 is formed in an integral structure consisting essentially of a plurality of collars 20, 21, and 22 axially spaced one from the other and each separated by a frangible neck portion 23 and 24. The innermost collar 20 (with respect to the bolt 13) is adapted to abut the adjacent surface of one of the parts, for example part 10, so as to work in opposition to the bolt head 19 whereby the parts 10 and 11 are secured. It is this innermost collar 20 that constitutes the nut proper, being the permanent element coacting with the bolt 18 as will become more apparent.

The intermediate and outermost collars 21 and 22 respectively are defined peripherally by flat surfaces 25, preferably in the form of a hexagon to constitute wrench-engaging means whereby the nut 18 is tightened on the bolt 13. The bolt head 19 and innermost collar 20 are thereby drawn toward one another to produce a clamping pressure on the parts 10 and 11 and to establish tension in the bolt shank 14. The depth of the frangible neck 23 located between the innermost collar 20 and intermediate collar 21 is more shallow by a predetermined amount than the similar neck 24 between the intermediate collar 21 and outermost collar 22 whereby torque forces applied to the nut 18 through the outermost collar 22 serve to break the latter neck 24 first. The degree of breaking force is variable as determined by the nature of the fastener installation and design requirements.

In the form of the invention shown in FIGURE 1 a laterally projecting flange or ring 26 is associated with the outermost collar 22 to act as an obstruction to prevent the torque applying tool or wrench from extending beyond the outermost collar 22 to the intermediate collar 21. This flange 26 may be integrally formed on the outermost collar 22 or merely an attached part equivalent for all intents and purposes to a lock washer.

In the form of the invention shown in FIGURE 2 the same effect is accomplished without means of such a flange 26 by simply disposing the outermost collar 22 in angular displacement with respect to the intermediate collar 21. Thus, a wrench coacting with the hexagonal surfaces 25 on the outermost collar 22 is not capable of concurrently engaging the similar surfaces 25 of the intermediate collar. Similarly, a sequential tightening of the collars from the outermost inwardly can be effected by progressively larger transverse dimensions thereof (FIGURE 3). This makes it necessary to use a different tool or wrench to torque each collar 21 and 22 as would also be the case where collars, having different shapes as defined for example by the number of surfaces 25 thereon, are used.

In any case, i.e., with the above collar forms or the equivalent, the torque forces are applied only to the outermost collar 22 until it is broken off after it has effected the complete insertion and preliminary installation of the bolt 13 in its opening 12. Thus, a connection of the parts 10 and 11 is made constituting the second stage of the installation as illustrated in the center of FIGURE 1. In this condition, the applied predetermined forces have placed the bolt 13 under predetermined tension whereby the parts 10 and 11 are clampingly secured.

Subsequently, the joint effected by the fastener across the connected parts 10 and 11 will relax, i.e., the applied tension in the bolt 13 gives way as the parts 10 and 11 tend to compress further effecting a loosened connection. The required time for the joint to relax will vary depending upon the materials and dimensions involved, i.e., the material and the relative dimensions of the parts 10 and 11, the bolt 13 and nut 18 and the sealant 15. After this relaxation has occurred, additional torque forces are applied to the nut 18 through the intermediate collar 21 up to a predetermined value when the frangible neck 23 breaks and the desired tension is produced in the bolt 18 resulting in a more permanent clamping pressure on the parts 10 and 11.

It is thus seen that after the initial tightening of the bolt 13 and an application of the desired clamping force between the joined parts 10 and 11 has been effected a relaxation occurs and the connection becomes loose. Such looseness is readily taken up by an application of additional torque forces to the nut 18 through the second torque-off collar 21 and a connection of desired tightness is effected. Thus, improved static strength or fatigue performance of the joint is achieved.

While only two torque-off collars 21 and 22 have been illustrated for purposes of explanation, it is to be understood that any number may be employed to the end that a joint of ultimate rigidity and tightness is effected whether or not a sealant is used therein. Also, the manner in which the nut 18 is fabricated has no bearing on the present invention. Any conventional or known method of fabrication may be employed. Thus, it can be constructed in a machining operation, cast or otherwise, however desired.

It is to be understood that the particular embodiments of the invention hereinabove illustrated and described have been selected for purposes of clarity and facilitating an explanation of the invention. They are not to be construed as limitations of the invention.

What is claimed is:

1. An internally threaded nut having a bearing end and having at least two torque-off collars extending coaxially from the end thereof opposite said bearing end, each collar having wrench engaging means thereon, and each collar being separated axially from the next collar and from said nut by a shear neck, said collars and said shear necks each having an opening therethrough coaxial with the threaded bore in said nut, each successive neck in the direction away from said nut having an effective cross section of predetermined dimension less than that of the next adjacent neck in the direction toward said nut, the material of all of the shear necks being the same, whereby said nut may be tightened to a plurality of predetermined torque values.

2. The nut of claim 1 wherein said wrench engaging means is a plurality of peripheral tangentially disposed surfaces and including a partition between each successive collar to prevent a wrench when applied to the outermost collar from simultaneously contacting the next adjacent inner collar.

3. The nut of claim 1 wherein said wrench engaging means is a plurality of peripheral tangentially disposed surfaces, said surfaces of each adjacent projection being angularly displaced relative to the next.

4. The nut of claim 1 wherein each successive said collar from the nut outwardly has a smaller transverse dimension.

5. The nut of claim 1 wherein said means of each said collar differs from the next adjacent collar.

References Cited

UNITED STATES PATENTS

| 3,027,796 | 4/1962 | Shewmon | 85—61 |
| 3,370,341 | 2/1968 | Allsop | 85—61 |

FOREIGN PATENTS 638,195  5/1950  Great Britain.

CARL W. TOMLIN, Primary Examiner.

RAMON S. BRITTS, Assistant Examiner.